Figure 1:
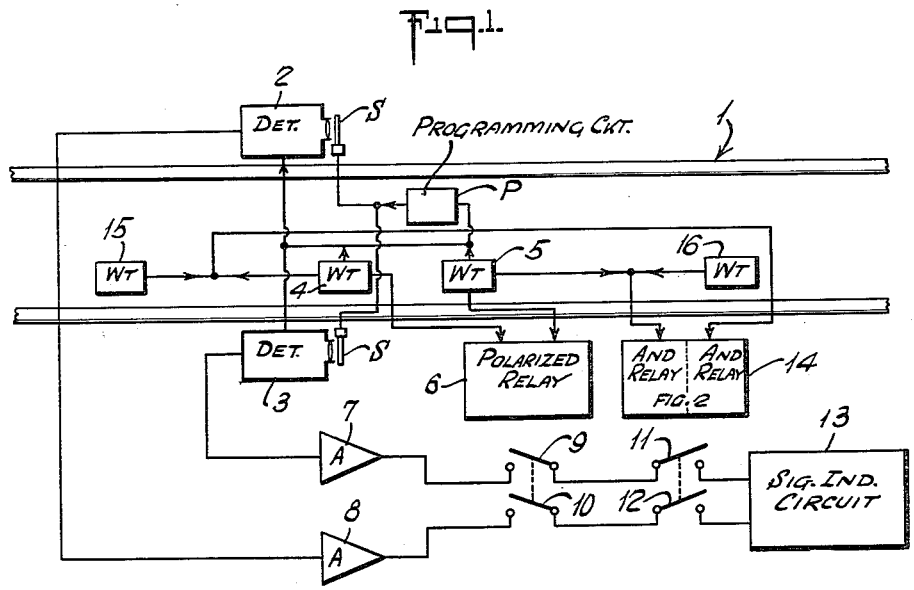

HOT-BOX DETECTOR GATING CIRCUIT

Filed Nov. 21, 1958

INVENTORS
HAROLD S. REMZ
ALBERT WAKSHINSKY
BY Mitchell & Bechert
ATTORNEY 3,079,497
HOT-BOX DETECTOR GATING CIRCUIT
Harold S. Remz, Westbury, and Albert Wakshinsky, Port Washington, N.Y., assignors to Servo Corporation of America, New Hyde Park, N.Y., a corporation of New York
Filed Nov. 21, 1958, Ser. No. 775,453
5 Claims. (Cl. 246—169)

This invention relates to a hot-box detector circuit, and more particularly to an arrangement for detecting and indicating the intensity of heat signals from journal bearings of railroad cars, of a particular wheel base.

The type of hot-box detector circuit to which this invention relates comprises an infra-red radiation detector mounted trackside, and positioned to focus an image of the infra-red cell on the successive journal boxes as the train moves by the detector. The signals developed by the detector correspond to the heat intensity of the journal boxes. The signals are amplified and then applied to an indicator-alarm circuit. If a hot-box condition exists, a signal of comparatively high amplitude is developed by the detector, which when amplified operates an alarm circuit. For a more detailed discussion of the general hot-box detector circuit, reference is made to copending application Serial No. 747,553, filed June 30, 1958, for Hot-Box Detector, now Patent No. 2,880,309.

Hot-box detectors are generally utilized to detect heat radiations from journal bearings on freight cars. Most other types of cars, such as locomotives and passenger cars, use roller bearings which generally are not subject to hot-box failure. However, roller bearings operate at considerably higher temperatures than journal bearings and occasionally cause false alarm signals. In addition, locomotives and passenger cars have stray heat sources, such as steam leaks in the vicinity of the bearings, so that when such heat sources are detected, they may also cause false alarm signals.

Studies of car construction, wheel-base, etc. have revealed that, with the exception of only a small percentage, freight-car trucks have a common size wheel-base which is different from the truck wheel-base of other types of cars, such as passenger cars and locomotives. This invention takes advantage of the distinctive freight-car truck wheel-base.

Accordingly, it is an object of the invention to provide a hot-box detector circuit comprising a gating circuit responsive only to cars of a particular truck wheel-base, for "passing" signals from the detector to the indicator.

It is a further object of this invention to provide a unique gating circuit, which may be adapted to existing installations, for "passing" signals only from cars of a given truck wheel-base to a signal indicator.

In accordance with an aspect of the invention, there is provided a hot-box detector circuit comprising a trackside-mounted heat detector positioned to detect heat radiations from railroad car bearings as the car moves over a given section of track. The heat detector produces signals which correspond to the heat radiations. The signals are applied to a signal indicating means, whereby the relative amplitudes of the signals may be observed for hot-box detection. The invention is characterized by mounting wheel-responsive means, in the given section of track, which is adapted to produce electrical energy in response to wheels separated by a given wheel-base. A gating circuit is interposed between the detector output and the indicator, which is opened by the electrical energy, for passing signals to the indicator.

Figure 2:
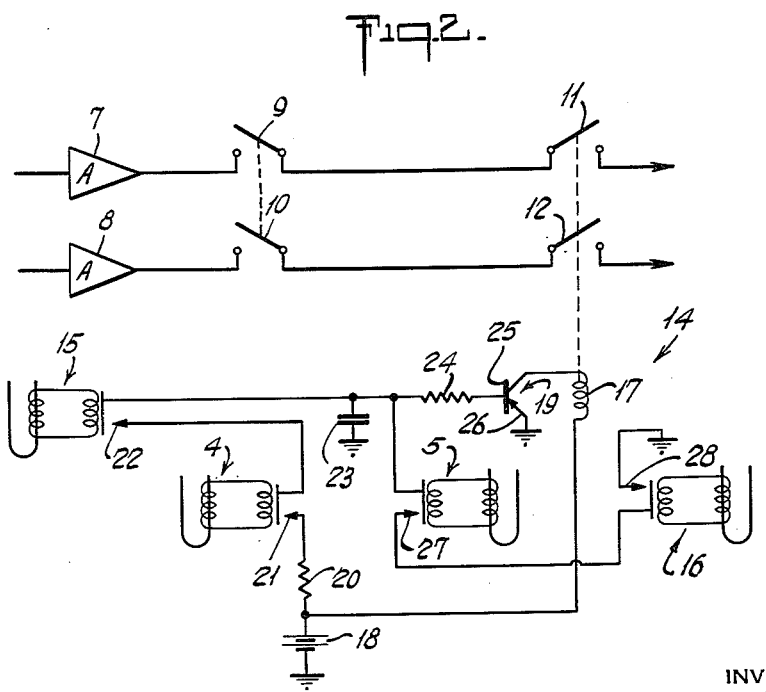

The above-mentioned and other features and objects of this invention and the manner of attaining them will become more apparent and the invention itself will be best understood by reference to the following description of an embodiment of the invention taken in conjunction with the accompanying drawing, wherein:

FIGURE 1 is a block diagram of the general arrangement of the novel hot-box detecting circuit in relation to a section of railroad track; and FIGURE 2 is a schematic diagram of a multiple coincidence gating circuit utilized in the system illustrated in FIGURE 1.

Referring first to FIGURE 1, there is illustrated a section of track 1, wherein the trackside-mounted equipment is installed for detecting hot-boxes.

The equipment comprises a pair of detectors 2, 3 mounted alongside each of the tracks 1 and positioned to detect infra-red radiations from journal bearings on the rolling freight stock. The detectors are of a type described in detail in the above-mentioned application. Briefly, each heat detector comprises a pair of heat sensitive cells connected in a balanced bridge circuit. One of the heat sensitive cells is shielded from external radiations and is, therefore, at ambient temperature. The other cell is exposed to heat radiations which are focussed on the cell by a suitable lens arrangement. Thus, as the rolling stock passes by the detectors 2, 3, images of the respective cells are focussed on the successive journal boxes. The heat radiations upset the bridge balance and the signal output is proportional to the strength of the received radiations.

The detectors 2, 3 also comprise electrically operated shutter mechanisms S to block unwanted background radiation from the heat sensitive cells, and to prevent dirt particles and other obscuring matter from collecting on the optic lens in the absence of a train. Shutters S are opened when the first wheel of a train operates wheel-trip 4, and they are held open for the full passage of the train, as will be pointed out.

The wheel-trip 4, and each of the other wheel-trip devices to be referred to, comprises preferably a magnetic circuit mounted close to the track. The device is designed to deliver an electrical impulse when a railroad wheel passes over it. A detailed description of a preferred wheel-trip device may be found in copending application Serial No. 670,220, filed July 5, 1957, for Railroad Wheel Trip.

In order that the effective field of detection of the detector be limited to the journal boxes, after the shutter mechanism has been opened, a gating system is provided. The gating system comprises wheel-trip devices 4 and 5 spaced a predetermined distance apart.

The detectors 2, 3 are positioned relative to the wheel-trip devices so that as the forward wheel of a given truck passes over wheel-trip 4, assuming the train to be moving from left to right, the first of the two associated journal boxes of the truck is just entering the field of detection, and when the same wheel passes over wheel-trip 5, the associated journal boxes are passing out of the field of detection.

The wheel-trip devices 4, 5 are connected to a programming circuit P which actuates the shutter shown diagrammatically at S. The programming circuit is preferably a simple storage circuit which prevents pulses after the first pulse from operating the shutter mechanism. The first pulse therefore opens the shutter, and the pulse produced by the last wheel, after a given time delay closes the shutter. The shutter thus stays open for the complete passage of a train. The wheel-trip devices are also coupled to a gating circuit, shown for simplicity in FIGURE 1 as a polarized relay 6.

The signal outputs from the detectors 2, 3 are respectively amplified at 7 and 8, and applied over relay contacts 9, 10 and 11, 12 to a signal indicator and alarm circuit 13. The contacts 9 and 10 are contacts of the polarized relay 6. The contacts 11 and 12 are contacts of a relay circuit shown by block diagram 14 in FIGURE 1, and in detail in FIGURE 2.

In the conventional detector circuits, no provision was made for discriminating against wheel bases of locomotives and passenger cars, and only wheel-trip devices 4, 5 were provided for controlling the signalling circuit. In other words, the earlier signalling circuit did not include contacts 11 and 12. If we assume these contacts to be closed, then it is apparent that the signalling circuit is controlled by the gate circuit 6.

Thus, when the first wheel of the train passes over the wheel-trip device 4, a pulse is produced which opens the shutter mechanisms of detectors 2 and 3 and which energizes the relay 6 to close contacts 9 and 10. The signals developed by detectors 2 and 3, corresponding to the heat radiations from the respective journal boxes, are amplified and, if contacts 11 and 12 are also closed, are applied to the signal indicator circuit 13. The signal indicator circuit may include alarm devices of both the visual and audible type, devices for recording the heat signals from each of the journal boxes, etc. When the same wheel passes over wheel-trip device 5, a pulse is produced which opens the contacts 9 and 10, thereby preventing any further signals from passing to the signal indicator 13. For each succeeding wheel passage, the trips 4—5 will perform the function of transiently opening and closing the output circuits supplied by detector-amplifiers 3—7 and 2—8, respectively.

The hot-box detector circuit as just described (and assuming unbroken lines in place of contacts 11—12) is conventional, and details of the circuit may be learned from the above-mentioned copending applications. In accordance with this invention, the circuit is improved to discriminate against railroad cars having wheel bases different from the wheel base of freight cars.

To accomplish this discrimination, two additional wheel-trip devices, similar to the devices 4 and 5, are provided. The additional devices are shown at 15 and 16. The wheel-trip device 15 is separated from wheel-trip device 4 by a distance equal to the truck wheel base of a freight car. Similarly, wheel-trip device 16 is spaced from wheel-trip device 5 by the distance of a truck wheel base of a freight car. In effect, therefore, the circuit is provided with dual gating means; the gates being connected in series so that a pair of predetermined conditions must exist before "heat" signals are applied to the signal indicator. Coincident actuation of the wheel-trip devices 15 and 4 operates to open a first gate circuit, which is closed by coincident actuation of wheel-trip devices 5—16; and wheel-trip devices 4 and 5 constitute, respectively, the opening and closing means for the second gate circuit. The purpose of the wheel-trip device 16 and its relationship with wheel-trip device 5 will be more fully described in connection with FIGURE 2.

The contacts 11 and 12 are closed by the relay circuit 14 only when the wheel-trip devices 15 and 4 are simultaneously actuated, thus certifying that a truck of desired wheel base is present for journal-heat inspection. This coincidence detection is schematically suggested in FIGURE 1 by "AND" circuit connecting the devices 4 and 15. Since an "AND" circuit produces a pulse only in response to coincident inputs, no signal will be applied to the relay 14 unless both wheel-trips 4 and 15 are energized simultaneously.

An "AND" circuit is also shown connected to the wheel-trips 5 and 16, suggesting that coincident application of pulses is required in order for the "AND" circuit to deliver a signal to the relay 14. The signal produced by the first "AND" circuit energizes the relay 14 and closes the contacts 11, 12, and the signal produced by the second "AND" circuit results is opening the contacts 11, 12, thus certifying that the truck of desired wheel base has just passed the location of journal-heat inspection.

It should now be apparent that the gating circuits are in the nature of multiple coincidence gating circuits, which are shown schematically in greater detail in FIGURE 2. It will be recalled that the basic function of the improved circuit is to close contacts 11, 12 in response to coincident operation of the wheel-trips 4, 15 and to open the contacts in response to coincident operation of the wheel-trips 5 and 16. The element which performs this function is relay 14, comprising coil 17 and contacts 11, 12.

The energizing circuit for the coil 17 comprises a battery 18 connected over the coil, through a transistor 19, to ground. The transistor is normally cut off and, therefore, the energizing circuit is normally open. The control circuit for the transistor 19 comprises the battery 18, a dropping resistor 20, normally open wheel-trip contacts 21, 22 and capacitor 23 to ground. The control circuit constitutes a charging circuit for the capacitor 23. When the capacitor 23 is charged, its voltage is sufficient to cause the transistor 19 to conduct and thereby close the energizing circuit for the coil 17. The capacitor discharge circuit comprises resistor 24, base electrode 25, emitter electrode 26, to ground.

The control circuit is shunted to ground by normally open contacts 27 and 28 of wheel-trip devices 5 and 16, respectively. Thus, when the wheels of a truck of given wheel base, i.e., the wheels of a freight car truck, pass over wheel-trip devices 15 and 4, the contacts 21 and 22 are simultaneously closed and the charging circuit from battery 18 to capacitor 23 is completed. The positive voltage on capacitor 23 causes the transistor to conduct, thereby closing the coil energizing circuit. Energization of coil 17 closes the contacts 11 and 12, respectively. At the same time, the forward wheel, having actuated wheel-trip device 4 closes the contacts 9 and 10, thereby completing the circuit from the detector to the signal indicator.

The value of the resistor 20 is selected so that the charging time is relatively short. The value of the resistor 24 is selected so that the discharge time through this resistor and the base-emitter circuit of the transistor is sufficiently long so that the coil 17 remains energized for a period sufficient to permit an entire freight truck moving at a slow speed to pass from wheel-trip 4 to wheel-trip 5. It will be recalled that the contacts 9 and 10 are closed merely by a wheel passing over the wheel-trip device 4; contacts 9 and 10 are opened by the wheel passing over wheel-trip 5.

The contacts 11, 12 are opened by the simultaneous operation of wheel-trip devices 5 and 16. Operation of the wheel-trips 5 and 16 closes the contacts 27, 28, thereby short-circuiting the capacitor 23 to ground. A positive and abrupt discharging circuit is required in order that the circuit may be prepared for the following car. In the absence of such a circuit, the charge on capacitor 23 may be carried over to the following car, which may be another type of car carrying spurious heat sources.

If desired, the contacts 11 and 12 may be by-passed to a recording storage device, e.g., a paper recorder, for storing the information transmitted by the detectors.

While the foregoing description sets forth the principles of the invention in connection with specific apparatus, it is to be clearly understood that this description is made only by way of example and not as a limitation of the scope of the invention as set forth in the objects thereof and in the accompanying claims.

We claim:
1. A hot-box detector circuit, comprising a heat detector, including heat-responsive means producing an electrical signal in response to incident radiant energy, and adapted to be mounted on one side of a length of railroad track, optical means imaging said heat-responsive means on passing railroad journal boxes when so mounted, signal indicating means coupled to the output of said detector, wheel-responsive means mounted in said section of track and adapted to produce electrical energy in response to wheels separated by a given car-truck wheel base, gating means interposed between said detector and said indicator, said gating means including a first coincidence circuit comprising a first pair of wheel-trip devices spaced a distance equal to said given wheel base, the respective devices comprising serially connected normally open contacts disposed to control the passage of detector signals to said indicator only upon coincident closure thereof, the respective devices each including means for closing said contacts in response to a wheel passing thereover, whereby the serially connected contacts are closed simultaneously only when a car of said given wheel base passes over said pair of wheel-trip devices, and a second coincidence circuit comprising a second pair of wheel-trip devices similar to said first pair and spaced a distance equal to said given wheel base, adjacent trip devices of said first and second pairs being spaced along the track a predetermined distance related to the field of detection of said detector, the distance being such that when a wheel passes over the first of said adjacent devices, the associated bearing is entering the field of detection and when said wheel passes over the second of said adjacent devices, the said bearing is leaving the field of detection, and means responsive to the coincident actuation of both wheel-trip devices of said second pair and in closing relation with said gating means, whereby said gating means will be operative to open and close only for the duration of passage past said detector of a truck having said given wheel base.

2. A hot-box detector circuit according to claim 1, in which second gating means is connected to be operated in opening and closing directions respectively by the first and second of said adjacent devices, said second gating means being effectively connected in series in controlling relation with the output of said detector to said signal-indicating means.

3. A hot-box detector circuit, comprising a heat detector, including heat-responsive means producing an electrical signal in response to incident radiant energy and adapted to be mounted on one side of a length of railroad track, optical means imagining said heat-responsive means on passing railroad journal boxes when so mounted, signal-indicating means coupled to the output of said detector, and including gating means determining the passage or not of a signal from said detector to said signal-indicating means, first wheel-responsive means mounted in said section of track and adapted to produce an electrical signal in response to coincident detection of wheels separated by a given car-truck wheel base, said first wheel-responsive means being located along the track at a location prior to detection by said heat detector of heat from either of the journals of the particular car truck, second wheel-responsive means mounted in said section of track and adapted to produce an electrical signal in response to coincident detection of wheels separated by said given car-truck wheel base and located along the track at a location beyond the location at which said detector observes journal heat from said car truck, means operative by said first wheel-responsive means for opening said gating circuit, and operative by said second wheel-responsive means for closing said gating circuit.

4. A hot-box detector circuit comprising a heat detector including heat-responsive means producing an electrical signal in response to incident radiant energy and adapted to be mounted on one side of a length of railroad track, optical means imaging said heat-responsive means on passing railroad journal boxes when so mounted, signal-indicating means coupled to the output of said detector, wheel-responsive means mounted in said section of track and adapted to produce electrical energy in response to wheels separated by a given car-truck wheel base, said wheel-responsive means comprising a first pair of wheel-trip devices separated a distance equal to said given wheel base, a second pair of wheel-trip devices separated a distance equal to said wheel base and separated from the wheel-trip devices of said first pair, and a gating circuit interposed between the detector output and said signal-indicating means, the respective wheel-trip devices comprising normally open contacts and means for closing each of said contacts in response to a wheel passing thereover, control mechanism including a series connection of the contacts associated with said first pair for opening said gating circuit upon coincident closure of said contacts associated with said first pair, said control mechanism further including a series connection of the contacts associated with said second pair for closing said gating circuit upon coincident closure of the contacts associated with said second pair, the spacing between said pairs being such in relation to the truck parts imaged by said optical means as to define a gate-open interval embracing the scan of two journal boxes on one side of one truck, whereby said gating circuit is operated only when a car of said given wheel base passes through said length of track.

5. The circuit of claim 4, and including a second gating circuit between the detector output and said signal-indicating means, said second gating circuit being operated by those two adjacent wheel-trip devices which are intermediate the ends of the succession of wheel-trip devices of said pairs, said second gating circuit including a gate-opening connection to one of said adjacent wheel-trip devices and a gate-closing connection to the other of said adjacent wheel-trip devices, whereby signals will be passed to said indicator only upon concurrent operation of said first and second gating circuits.

References Cited in the file of this patent

UNITED STATES PATENTS

| | | |
|---|---|---|
| 2,033,645 | Parkhill | Mar. 10, 1936 |
| 2,138,645 | Rey | Nov. 29, 1938 |
| 2,630,043 | Kolisch | Mar. 3, 1953 |
| 2,781,477 | Jenner | Feb. 12, 1957 |
| 2,818,508 | Johanson et al. | Dec. 31, 1957 |
| 2,856,539 | Orthuber et al. | Oct. 14, 1958 |
| 2,963,575 | Pelino et al. | Dec. 6, 1960 |